Figure 1:
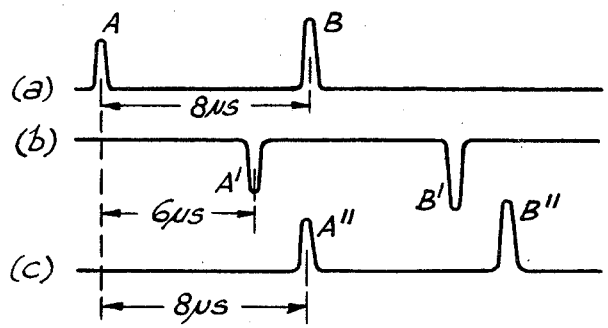

Nov. 3, 1964     A. ALLEN     3,155,966
SECONDARY RADAR SYSTEMS

Filed July 23, 1959     2 Sheets-Sheet 1

INVENTOR
Alaric Allen
BY
Ralph B. Stewart
ATTORNEY

United States Patent Office 3,155,966
Patented Nov. 3, 1964

3,155,966
SECONDARY RADAR SYSTEMS
Alaric Allen, Ashford, England, assignor to A. C. Cossor Limited, London, England, a British company
Filed July 23, 1959, Ser. No. 829,074
Claims priority, application Great Britain July 10, 1959
6 Claims. (Cl. 343—6.8)

The present invention relates to secondary radar systems in which recurrent groups of pulses are transmitted and are picked up by a transponder which is arranged to transmit a signal when the interrogating signals picked up have predetermined characteristics. The interrogating transmissions may be from a ground station and the transponder may be in an aircraft.

It is necessary to transmit interrogating pulses from a directional antenna and such an antenna radiates not only in a main lobe but also in side lobes and it is important to prevent actuation of the transponder by signals transmitted in the side lobes.

One secondary radar system, which is the subject of international agreement, employs recurrent pairs of pulses A and B of which the first A is a control pulse radiated from an omnidirectional antenna intended to provide the suppressive function required to prevent response to side lobes of a directional antenna from which pulses B are transmitted. The transponder is so arranged that it is actuated only when pulse B is received at an amplitude greater than a predetermined fraction of the amplitude at which pulse A is received.

Another system has been proposed employing recurrent groups of three pulses of which the first and third, $A_1$ and $B_1$, are interrogating pulses radiated from a directional antenna and the second, $C_1$, is a control pulse radiated from an omnidirectional antenna. For actuation of the transponder, pulses $A_1$ and $B_1$, which may be of equal amplitude, must be received at an amplitude greater than a predetermined fraction of the amplitude at which pulse $C_1$ is received.

The present invention has for its principal object to provide a simple circuit which operates efficiently with either of the systems hereinbefore referred to.

A further object of the invention is to provide a simple circuit which operates efficiently with either of the systems hereinbefore referred to without the need for adjustment by the operator.

Another object of the present invention is to provide a circuit which is suitable for use with either of the systems hereinbefore referred to which involves only a simple modification of known circuits designed for use with the first of the said systems.

According to the present invention there is provided a transponder suitable for use with a secondary radar system employing either a control pulse A radiated from an antenna of relatively low directivity followed by an interrogating pulse B radiated by an antenna of relatively high directivity, or two interrogating pulses $A_1$ and $B_1$ separated by the same time interval as pulses A and B and radiated from an antenna of relatively high directivity, and in the interval between these pulses a control pulse $C_1$ radiated from an antenna of relatively low directivity, the transponder comprising a coincidence circuit responsive only to pulses occurring simultaneously and at predetermined amplitudes or in predetermined amplitude relation at two input terminals thereof, means for applying the received pulses to both of the said input terminals, the pulses applied to one of the terminals being delayed substantially by the interval between pulses A and B relatively to the pulses applied to the other input terminal, and means for applying to one of the input terminals the received pulses reversed in sign relatively to the other pulses applied to this input terminal and delayed substantially by the interval between pulses $C_1$ and $B_1$.

Figure 2:
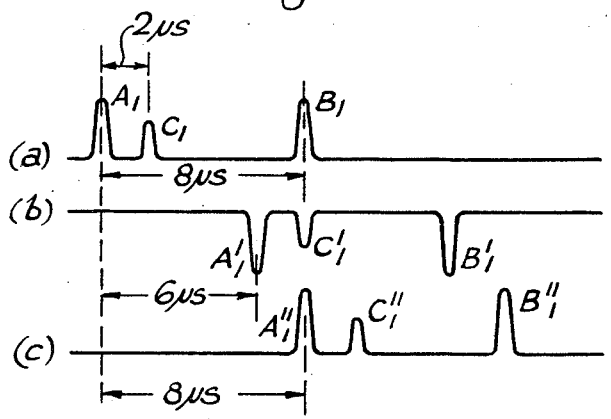
Figure 3:
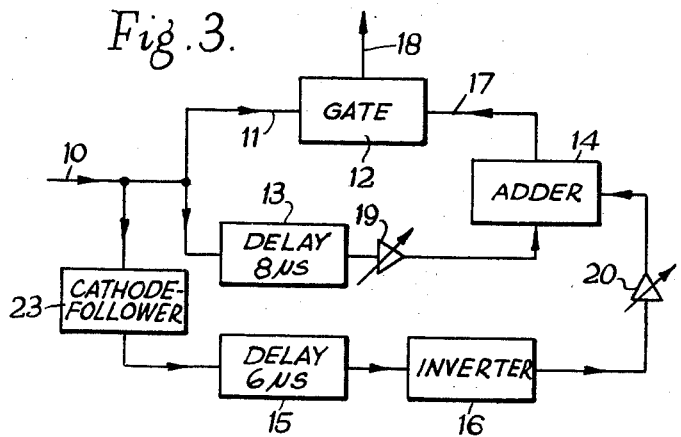
Figure 4:
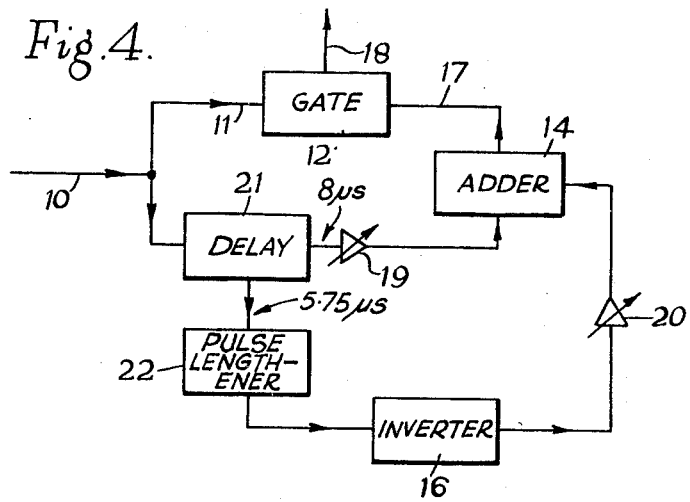

The invention will be described, by way of example, with reference to the accompanying drawings, in which:
FIGS. 1 and 2 contain waveform diagrams and
FIGS. 3 and 4 are block circuit diagrams of two embodiments of the invention.

Certain time delays are assumed in the following description and it will be understood that these are given only by way of example.

Referring to FIG. 1, there is shown at (a) one pulse group which is recurrent at any convenient time interval. The group consists of two pulses A and B separated by an interval of 8 microseconds. Pulse A is radiated from an omnidirectional antenna and pulse B is radiated from a directional antenna. In order that the transponder may be actuated, the amplitude of the pulse B, as received, must be greater than a predetermined fraction of the amplitude at which the pulse A is received.

FIG. 2 shows at (a) the other type of pulse group to which it is desired that the transponder should respond. This group comprises two pulses $A_1$ and $B_1$, which may, as shown, be of equal amplitude (but are not necessarily so), radiated from a directional antenna and separated by an interval of 8 microseconds and a third pulse $C_1$ radiated from an omnidirectional antenna. The interval between $A_1$ and $C_1$ is assumed to be 2 microseconds so that the interval between $C_1$ and $B_1$ is 6 microseconds.

Referring to FIG. 3, the received pulses are applied at 10 and are fed firstly to one terminal 11 of a coincidence gate 12, secondly through a delay network 13 to one input terminal of an adder 14, and thirdly through a further delay network 15 and a sense inverter 16 to another input terminal of the adder 14. The output of the adder 14 is fed to the other input terminal 17 of the gate 12.

The gate 12 is so arranged that it responds and produces an output at its output terminal 18 only when pulses occur simultaneously at its input terminals 11 and 17 and when these pulses have predetermined amplitudes or are in a predetermined amplitude relation. When an output occurs at 18 the transmitter of the transponder is triggered in known manner. The network 13 introduces a delay of 8 microseconds and the network 15 a delay of 6 microseconds.

Assuming first that the signal of FIG. 1(a) is applied at 10, the signal applied to the adder 14 through 15 and 16 has the form shown at A', B' in FIG. 1(b), that is to say it is inverted and delayed by 6 microseconds. The signal applied to the adder 14 through 13 has the form shown at A'', B'' in FIG. 1(c), that is to say it has the same sense as the signal at 10 and is delayed by 8 microseconds.

The signal of FIG. 1(b) has no effect but the signals of FIG. 1(a) and (c) give rise to simultaneous pulses B and A'' and the circuit 12 is so constituted that provided that the amplitude of B is greater than a predetermined fraction of A'', an output is produced at 18.

If a signal $A_1 C_1 B_1$ as shown in FIG. 2(a) is applied at 10, the signals $A_1' C_1' B_1'$ and $A_1'' C_1'' B_1''$ of FIGS. 2(b) and (c) are applied to the adder 14. The pulse applied to the input 17 of the gate 12 at the time of coincidence with the pulse $B_1$ applied to the input 11 will be a pulse $A_1''$ reduced in amplitude by the pulse $C_1'$. If the ratio of the amplitude of the pulse $C_1'$ to that of the pulse $A_1''$ has a value which is greater than a predetermined value, as will be the case for reception from a side lobe, the amplide of the pulse applied at 17 will be too low for actuation of the transponder.

The gate 12 may be arranged to respond when the amplitudes of the pulses occurring simultaneously at 11 and 17 differ by less than a predetermined amount from equality or from some other predetermined relation.

Means, such as variable gain amplifiers 19 and 20, may be provided in order to compensate for differences in gain in the various paths although either or both of these amplifiers may in certain cases be omitted.

When the circuit branch 15, 16, 14 is added to an existing transponder in order to convert this into a circuit arrangement according to the present invention, it may be desirable to include some means, such as a cathode-follower 23 (or in the case of a transistor, an emitter-follower) to avoid appreciably increasing the load on the output of the receiver coupled to the terminal 10.

In FIG. 4 the two separate delay networks 13 and 15 are replaced by a tapped delay line 21. In order to provide the required tolerances to ensure reliable operation, the duration of one or more of the coincident pulses $B_1$, $C_1'$ or $A_1''$ may be increased. For example in FIG. 4 there is shown a pulse lengthener 22 which may, for example, increase the duration of the pulse $C_1'$ by 50%. If, for instance, the pulses received have a duration of 1 microsecond, the duration of the pulse $C_1'$ would become 1.5 microseconds. The delay of the pulse $C_1'$ is then reduced by half the increase in duration, that is by 0.25 microsecond. As shown in FIG. 4 the pulse lengthener 22 is connected to a tap on the delay line 21 giving a delay of 5.75 microseconds, the total delay introduced by the delay line being 8 microseconds as in the case of the device 13 of FIG. 3.

If the amplifier 20 is not used it may be desirable to provide an isolating or buffer valve in this circuit through 22, 16.

Although in FIGS. 3 and 4 the inverted and delayed signal is shown as applied to the same terminal 17 as the delayed and uninverted signal, if preferred, the delayed and inverted signal may be added to the undelayed signal from 10 and applied to the terminal 11, only the delayed and uninverted signal being applied to terminal 17.

The sense inverter 16 may form part of the adder 14 or its function may be performed by the amplifier 20. If preferred the signals fed to terminal 11 and through 13 in FIG. 3 may be inverted and that through 15 uninverted.

I claim:

1. A transponder for a secondary radar system comprising a coincidence circuit having two input terminals and an output terminal and responsive only to pulses in predetermined amplitude relation applied simultaneously to said two input terminals to generate a signal at said output terminal, means applying received pulses to one of said input terminals, delay means having at least one input and two outputs providing two different time delays, means applying received pulses to said input of said delay means, means coupling one of said outputs of said delay means to the other of said input terminals, sense-inverting means, and means coupling the other said output of said delay means through said sense-inverting means to said other input terminal.

2. A transponder for use in a secondary radar system employing a control pulse A radiated from an antenna of relatively low directivity followed by an interrogating pulse B radiated by an antenna of relatively high directivity, and also in a secondary radar system employing two interrogating pulses $A_1$ and $B_1$ separated by the same time interval as pulses A and B and radiated from an antenna of relatively high directivity, and in the interval between these pulses a control pulse $C_1$ radiated from an antenna of relatively low directivity, the transponder comprising a coincidence circuit having two input terminals and an output terminal and responsive to pulses in predetermined amplitude relation applied simultaneously to said two input terminals to generate a signal at said output terminal, a signal input terminal at which received pulses are supplied, a circuit connecting said signal input terminal with one input terminal of said coincidence circuit, an adder having two inputs and one output, means coupling the output of said adder to the other input terminal of said coincidence circuit, two branch circuits connecting said signal input terminal with the two inputs of said adder, each of said branch circuits including delay means for delaying the transmission of pulses therein with respect to the pulses transmitted in the other branch circuit, and sense-inverter means included in one of said branch circuits whereby in response to pulses $A_1$, $B_1$ and $C_1$ supplied to said signal input terminal the signal applied to the two inputs of said adder include respectively control and interrogating pulses in opposite senses and occurring simultaneously.

3. A transponder according to claim 2, further comprising a pulse lengthener coupled in one of said branch circuits.

4. A transponder according to claim 2, wherein said delay means provide a time delay substantially equal to the time interval between pulses A and B and wherein the other of said branch circuits includes further delay means providing a time delay substantially equal to the time interval between pulses $C_1$ and $B_1$.

5. A transponder according to claim 4, further comprising a pulse lengthener coupled in the branch containing said further delay means.

6. A transponder for a secondary radar system comprising a coincidence circuit having two input terminals and an output terminal and responsive only to pulses in predetermined amplitude relation applied simultaneously to said two input terminals to generate a signal at said output terminal, a signal input terminal at which received pulses are supplied, three branch circuits one coupling said signal input terminal to one of said two inputs of said coincidence circuit, and the other branch circuits coupling said signal input terminal to the other of said inputs of said coincidence circuit, delay means having at least one input and two outputs, providing two different time delays, one of said branch circuits including said input and one of said outputs of said delay means and another of said branch circuits including said input and the other output of said delay means, and sense-inverting means in at least one and not more than two of said branch circuits effecting a reversal of sense of pulses in one of said branch circuits which includes one of said outputs of said delay means relatively to pulses in the other two branch circuits.

References Cited in the file of this patent

UNITED STATES PATENTS

| 2,706,810 | Jacobsen | Apr. 19, 1955 |
| 2,800,651 | Marshall | July 23, 1957 |
| 2,807,715 | Lesti | Sept. 24, 1957 |
| 2,824,301 | Levell et al. | Feb. 18, 1958 |